US012092131B2

(12) United States Patent
Huang (10) Patent No.: US 12,092,131 B2
(45) Date of Patent: Sep. 17, 2024

(54) MOTOR MODULE AND MOTOR MODULE COMPRISING THE SAME

(71) Applicant: WALRUS PUMP CO., LTD., New Taipei (TW)

(72) Inventor: Ching Feng Huang, New Taipei (TW)

(73) Assignee: WALRUS PUMP CO., LTD., New Taipei (TW)

( * ) Notice: Subject to any disclaimer, the term of this patent is extended or adjusted under 35 U.S.C. 154(b) by 142 days.

(21) Appl. No.: 17/945,953

(22) Filed: Sep. 15, 2022

(65) Prior Publication Data

US 2023/0296112 A1 Sep. 21, 2023

(30) Foreign Application Priority Data

Mar. 15, 2022 (TW) .................................. 111109489

(51) Int. Cl.
*F04D 29/58* (2006.01)
*F04D 13/06* (2006.01)
*F04D 29/40* (2006.01)

(52) U.S. Cl.
CPC ........... *F04D 29/586* (2013.01); *F04D 13/06* (2013.01); *F04D 29/406* (2013.01)

(58) Field of Classification Search
CPC ...... F04D 13/06; F04D 29/406; F04D 29/586; F04D 29/588; F04D 29/628; H02K 5/203
See application file for complete search history.

(56) References Cited

U.S. PATENT DOCUMENTS

| 4,172,695 | A | * | 10/1979 | Uesugi | F04D 13/06 415/127 |
| 6,163,093 | A | * | 12/2000 | Shimizu | F04B 17/03 310/91 |
| 6,196,812 | B1 | * | 3/2001 | Siegel | F16C 3/18 417/415 |
| 2004/0020358 | A1 | * | 2/2004 | Siegel | H02K 7/083 92/72 |
| 2009/0041592 | A1 | * | 2/2009 | Huang | F04D 15/0005 417/279 |
| 2013/0259720 | A1 | * | 10/2013 | Mills | H02K 5/203 417/410.1 |

(Continued)

FOREIGN PATENT DOCUMENTS

CA 2894927 A1 * 6/2014 ............. F04B 17/03
CN 1210501 C 7/2005

(Continued)

*Primary Examiner* — Alexander B Comley
(74) *Attorney, Agent, or Firm* — RABIN & BERDO, P.C.

(57) ABSTRACT

A motor module and a water-cooling pump having motor module are provided. The motor module has a combined first shell and second shell, a driving shaft mounted on the first shell and second shell, the stator assembly is mounted in the first shell, and the rotor assembly is mounted on the driving shaft. An opening of the first shell forms a first mounting portion, which can be mounted on or detached from a second mounting portion of the second shell via easy means. The modularized motor module can be mounted into a water machine via an opening of a shell and then a motor cover is mounted on the opening of the shell, and a drawing mechanism and pressured housing can be mounted at another end, so the assembling process is easy.

4 Claims, 8 Drawing Sheets

(56) References Cited

U.S. PATENT DOCUMENTS

| | | | | |
|---|---|---|---|---|
| 2015/0069862 A1* | 3/2015 | Bulatow | ................ | H02K 5/203 |
| | | | | 310/43 |
| 2015/0345502 A1* | 12/2015 | Sinico | ................... | F04D 29/426 |
| | | | | 415/200 |
| 2015/0354581 A1 | 12/2015 | Gillespie | | |
| 2017/0218977 A1* | 8/2017 | Sinico | ................ | F04D 29/5806 |
| 2021/0115925 A1* | 4/2021 | Iizuka | .................... | H02K 5/203 |

FOREIGN PATENT DOCUMENTS

| | | | | | |
|---|---|---|---|---|---|
| CN | 205478371 U | * | 8/2016 | | |
| CN | 108843582 A | * | 11/2018 | ............ | F04D 13/06 |
| CN | 208190459 U | * | 12/2018 | | |
| CN | 110594160 A | * | 12/2019 | | |
| CN | 212130897 U | * | 12/2020 | | |
| DE | 60011168 | | 6/2005 | | |
| JP | 2016191378 A | * | 11/2016 | ............ | F04D 13/06 |
| KR | 2010011385 U | * | 11/2010 | | |
| KR | 2011007628 U | * | 8/2011 | | |
| TW | 324719 U | * | 1/2008 | ............ | F04D 13/16 |
| TW | M591126 U | * | 2/2020 | ............ | F04D 29/58 |
| TW | M609120 | | 3/2021 | | |

\* cited by examiner

MOTOR MODULE AND MOTOR MODULE COMPRISING THE SAME

BACKGROUND OF THE INVENTION

1. Field of the Invention

The present invention relates to a pump, especially to a water-cooling pump that has a modularized motor module and has cooling function to itself via water.

2. Description of the Prior Arts

Figure 7:
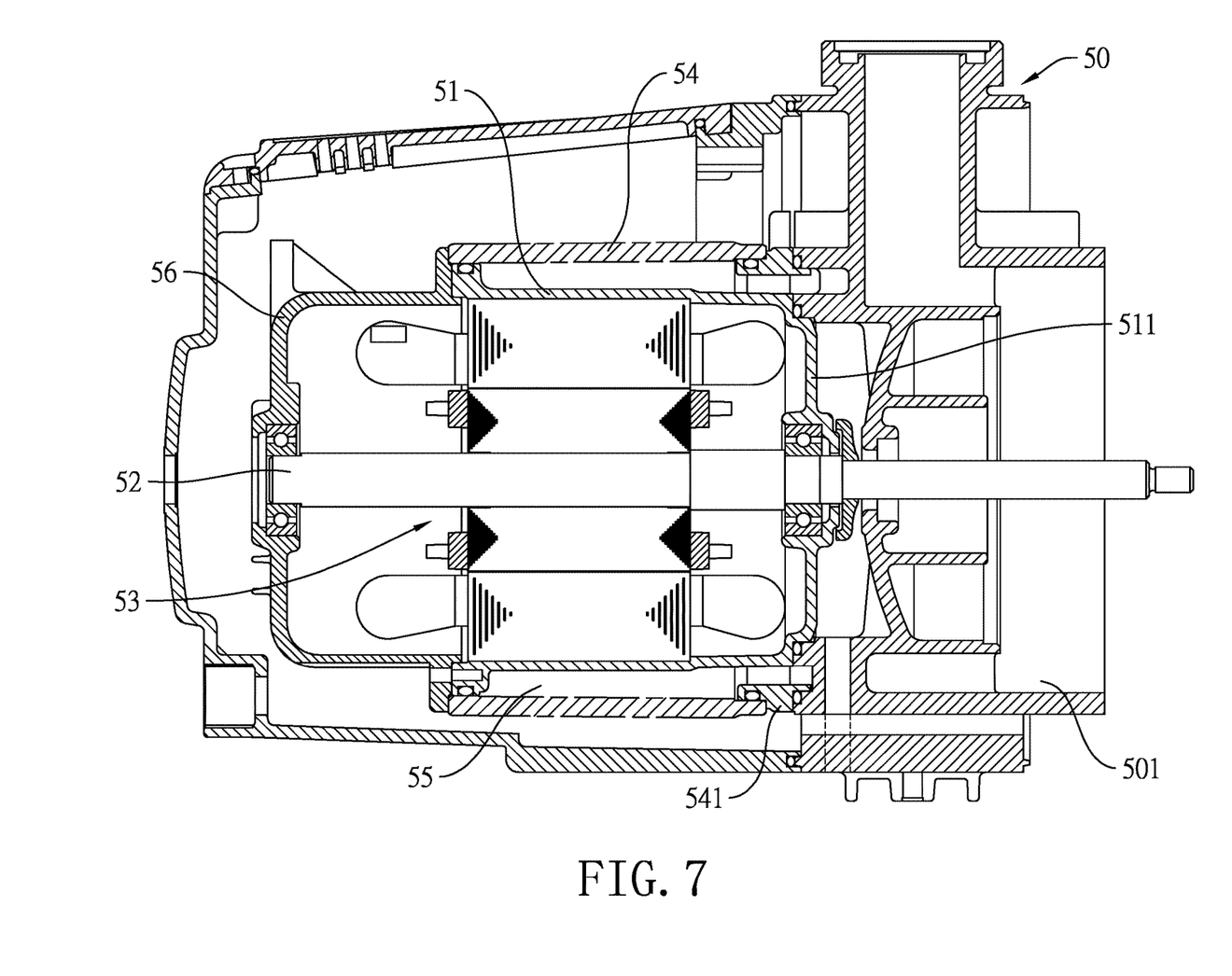
FIG. 7 is a sectional view of a prior art.

One of the current water-cooling pumps, such as Taiwan patent No. TW M591126 (as shown in FIG. 7), comprises a water machine 50. One end of the water machine 50 has an impeller chamber 501 that is configured to be mounted by an impeller. The impeller chamber 501 is sealed by some component out of the impeller chamber 501. Another end of the water machine 50 comprises a motor housing 51. A driving shaft 52 is mounted through an end cover 511 of the motor housing 51 and thus the driving shaft 52 extends into the motor housing 51. A motor assembly 53 comprises a stator assembly and a rotor assembly. The stator assembly is mounted on an inner surface of the motor housing 51 and the rotor assembly is mounted on the driving shaft 52. A cooling housing 54 is mounted on said another end of the water machine 50 and located out of the motor housing 51. The cooling housing 54 is hollow and a water-cooling space 55 is formed between the cooling housing 54 and the motor housing 51 such that water can flow in the water-cooling space 55 and cool the motor housing 51. A motor cover 56 is fixed on an end of the motor housing 51 and an end of the cooling housing 54 that are away from the water machine 50 via multiple fixing components. The driving shaft 52 is mounted through the end cover 511 of the motor housing 51 and the motor cover 56.

When the current pump is assembled completely and then is under testing, if the motor assembly 53 has any defect, the pump may not work smoothly. Therefore, all of the fixing components have to be removed from the motor cover 56 and then the motor cover 56 is removed, then the cooling housing 54 and a front assembling portion 541 of the cooling housing 54 are taken out and separated from the water machine 50. In addition, the pressured housing and related components that are mounted on the water machine 50 and seal the impeller chamber 501 have to be removed, and the driving shaft 52 which is connected to the impeller has to be removed, too. Thus, the dissembling processing consumes manpower and time. Besides, during assembling or dissembling, components may be damaged or consumables may be wasted because of carelessness, which is another problem.

Figure 8:
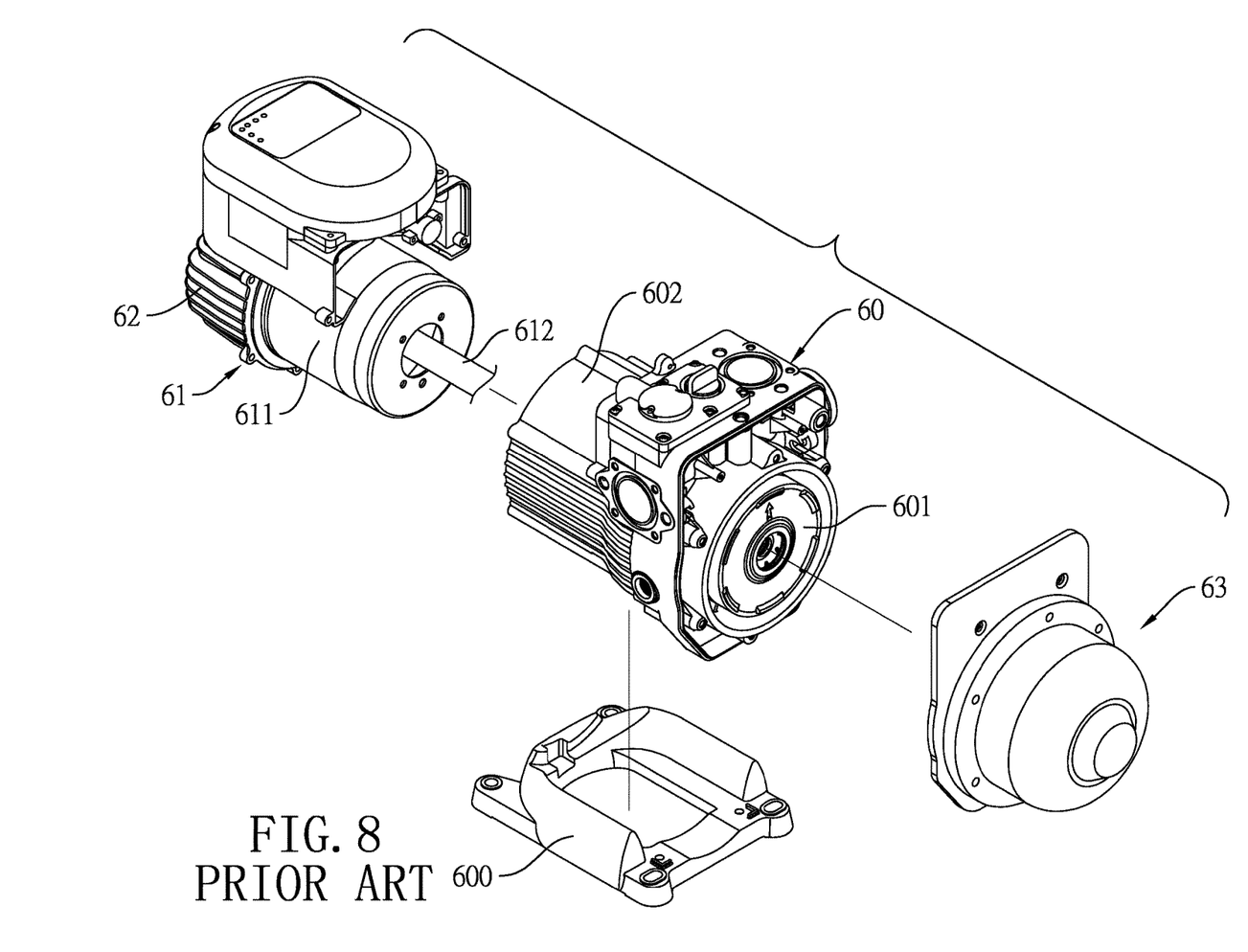
FIG. 8 is a sectional view of another prior art.

Another current water-cooling pump is provided according to Taiwan patent No. TW M609120 as shown in FIG. 8. A water machine 60 has a bottom stage 600 on a bottom of the water machine 60. Two ends of the water machine 60 form an impeller chamber 601 and a casing 602. An impeller can be mounted in the impeller chamber 601. The casing 602 is hollow and a driving assembly 61 can be mounted in the casing 602. The driving assembly 61 comprises a motor housing 611. A motor assembly is mounted in the motor housing 611 and the motor assembly has a motor shaft 612. The motor shaft 612 extends out and through the water machine 60, such that the motor shaft 612 is connected to the impeller. The motor assembly is capable of driving the motor shaft 612 and the impeller to rotate. The motor cover 62 is mounted on an end of the casing 602 via multiple fixing components and thereby the motor housing 611 is sealed in the casing 602, which forms a heat dissipation passage. Water may flow in the heat dissipation passage for dissipating heat. When the pump is assembled completely and then under examination, if a motor assembly of the driving assembly 61 has been damaged or has any defect, the motor cover 62 should be removed, the pressured housing 30 should be separated from the water machine 60, the impeller should be removed from the driving shaft 612, and the motor cover 62 should be removed from the water machine 60, then the defective motor assembly can be replaced by a new one. Then, the aforesaid components have to be assembled again. Thus, the dissembling processing also consumes manpower and time. Besides, during assembling or dissembling, components may be damaged or consumables may be wasted because of carelessness, which is another problem.

To overcome the shortcomings, the present invention provides a motor module and a water-cooling pump to mitigate or obviate the aforementioned problems.

SUMMARY OF THE INVENTION

The main objective of the present invention is to provide a motor module of a water-cooling pump that can be tested after manufactured. If complying with the quality requirement, the motor module can be installed on a water-cooling pump. If having defects, the motor module can be discarded before installation. Therefore, the water-cooling pump always has a qualified motor module, which avoids that after the water-cooling pump is assembled completely, the water-cooling pump has to be dissembled into each component and the defective motor module has to be replaced. In other words, the time consumption and the manpower to install the motor module again are saved, so the water-cooling pump is assembled more easily, and the time consumption and the cost are lower.

The motor module has a first shell, a second shell, a stator assembly, a driving shaft, and a rotor assembly. The first shell is hollow and has a first end. The first end forms an opening. The second shell is hollow and has a second end. The second end forms an opening. The second end is detachably butted on the first end. The stator assembly is mounted on an inner surface of the first shell. The driving shaft is rotatably mounted in the first shell and the second shell. The rotor assembly is mounted on the driving shaft and corresponds to the stator assembly in location.

The water-cooling pump has a water machine, a drawing mechanism, a pressured housing, a motor cover, a plurality of fixing components and an aforesaid motor module. The water machine has an impeller chamber and a casing. The impeller chamber is at an end of the water machine. The casing is at another end of the water machine. The casing is hollow and forms an opening. The opening of the casing is located away from the impeller chamber. The drawing mechanism is in the impeller chamber. The pressured housing is mounted on the water machine and seals the impeller chamber. The motor cover is hollow and forms an opening at an end thereof. The fixing components is mounted through the motor cover and the water machine such that the motor cover and the water machine are fixed on each other. The motor module is mounted on the water machine and in the casing via the opening of the casing. Two ends of the first shell of the motor module is sealed on the casing. One end of the driving shaft is mounted through the impeller chamber and connected to the drawing mechanism. A flow passage is formed between an outer surface of the first shell and an inner surface of the casing.

With the aforementioned structure, the present invention provides a motor module that has a first shell and a second shell connected together, the rotatable driving shaft is mounted in the first shell and the second shell, the stator assembly is mounted in the first shell, and the rotor assembly is mounted on the driving shaft. The motor module can be tested before installation on the water-cooling pump. If complying with the quality requirement, the motor module can be installed on the water-cooling pump. If any defect of the motor module is found, the motor module can be discarded. Therefore, all components of the water-cooling pump are flawless and thus the water-cooling pump complies with the quality requirement. Further, the time consumption and the cost of components are lower.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
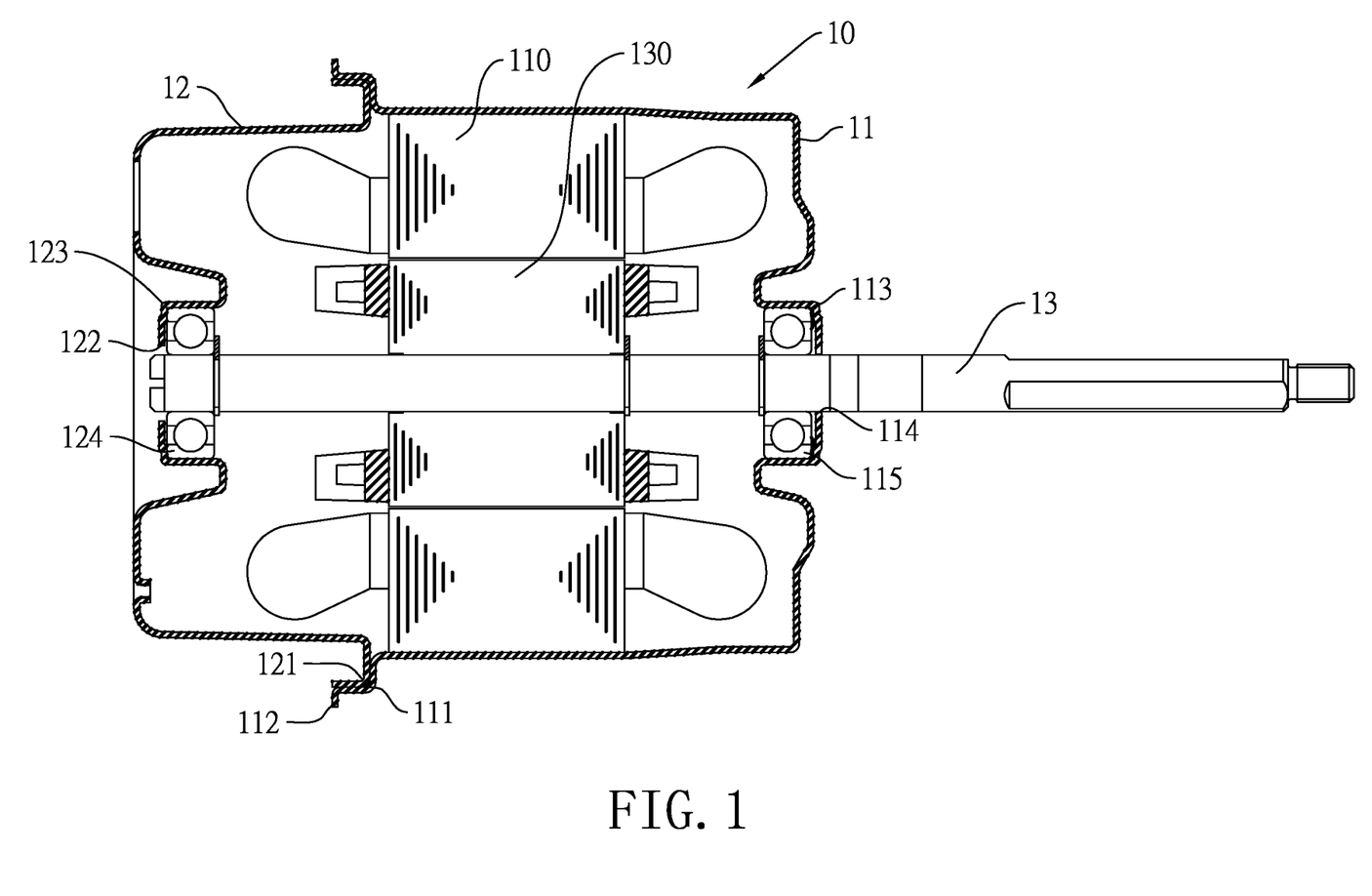
FIG. 1 is a sectional view of a motor module of a water-cooling pump in accordance with the present invention.
Figure 2:
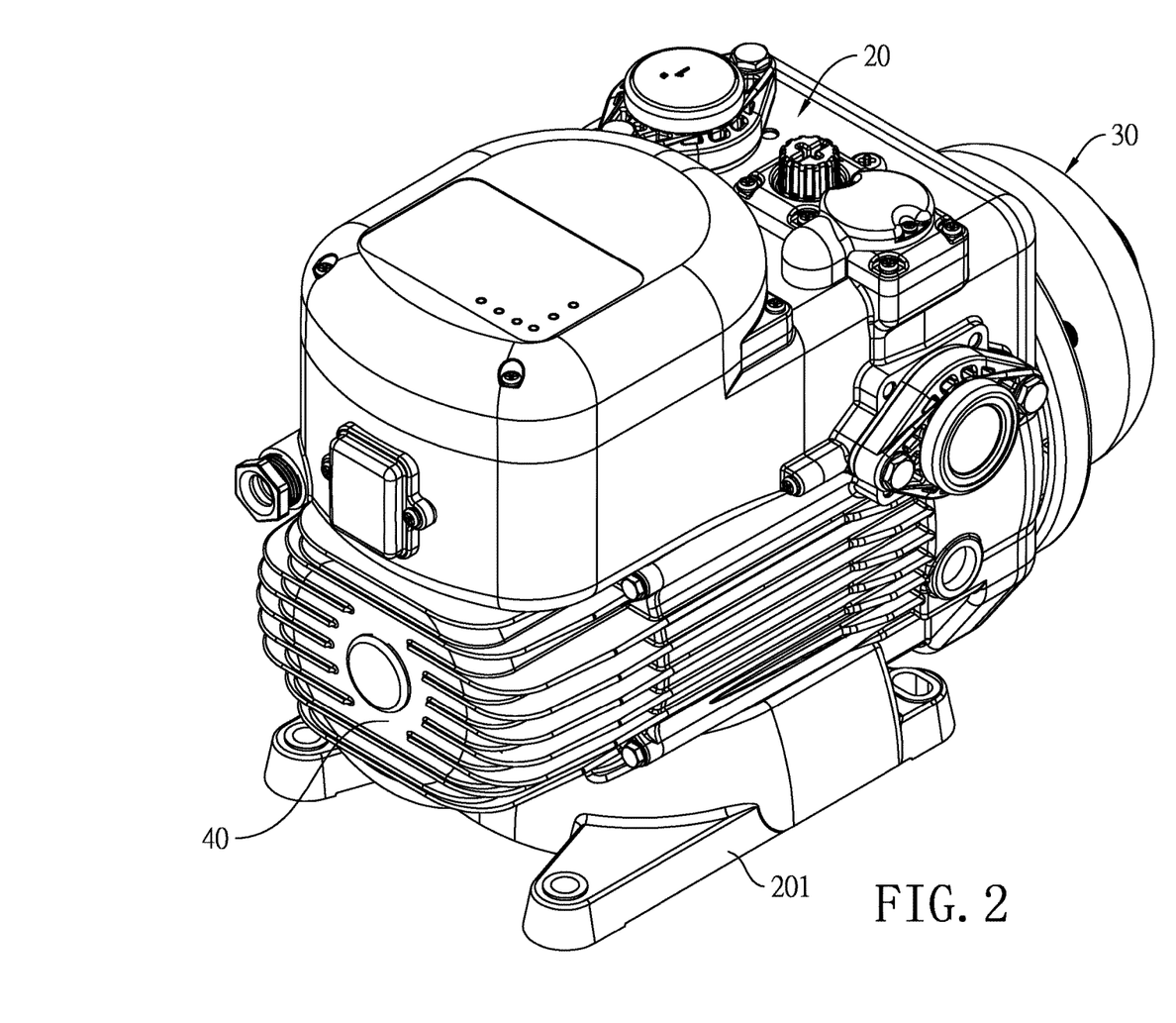
FIG. 2 is a perspective view of the water-cooling pump in FIG. 1.

With reference to FIG. 1 and FIG. 2, a motor module 10 in accordance with the present invention comprises a first shell 11, a second shell 12, and a driving shaft 13. Both of the first shell 11 and the second shell 12 are hollow bodies. The first shell 11 has a first end and the second shell 12 has a second end, and the first end and the second end are detachably butted on each other. The driving shaft 13 is rotatably mounted on the first shell 11 and the second shell 12. One end of the driving shaft 13 is mounted through the first shell 11 and thus extends outward.

As shown in the drawings, in one preferred embodiment, the first end of the first shell 11 forms an opening. The first end of the first shell 11 is machined around the opening via the metal forming technology, so the first end is bent and thereby forms a first mounting portion 111 and an enclosing board 112 in sequence. A cross section of the first mounting portion 111 is L-shaped, such that the first shell 11 forms an annular groove adjacent to the opening of the first shell 11. The enclosing board 112 is bent outward from the first mounting portion 111, so the enclosing board 112 extends from the first mounting portion 111 and an extending direction of the enclosing board 112 differs from that of the first mounting portion 111. Another end of the first shell 11 that is opposite the first end is bent inward at a center, such that the first shell 11 forms a bearing seat 113. The bearing seat 113 has a through hole 114 formed at a bottom surface of the bearing seat 113. A bearing 115 is mounted on the bearing seat 113. A stator assembly 110 is mounted on an inner surface of the first shell 11.

The second end of the second shell 12 forms an opening. The second end of the second shell 12 is machined around the opening via the metal forming technology, so the second end is bent and thereby forms a second mounting portion 121. A cross section of the second mounting portion 121 is L-shaped, such that the second shell 12 forms an annular protrusion adjacent to the opening of the second shell 12. Another end of the second shell 12 that is opposite the second end is bent inward at a center, such that the second shell 12 forms a bearing seat 123. The bearing seat 123 has a through hole 122 formed at a bottom surface of the bearing seat. A bearing 124 is mounted on the bearing seat 123.

The driving shaft 13 is an elongate stick. A rotor assembly 130 is mounted on the driving shaft 13. One end of the driving shaft 13 is mounted through the bearing 115 that is mounted in the bearing seat 113 of the first shell 11, and another end is mounted on the bearing 124 that is mounted in the bearing seat 123 of the second shell 12.

The mounting structures of the first mounting portion 111 of the first shell 11 and the second mounting portion 121 of the second shell 12 are shown in the drawings. In the preferred embodiment, the annular groove of the first mounting portion 111 and the annular protrusion of the second mounting portion 121 engage with each other. Precisely, the first mounting portion 111 and the second mounting portion 121 are tightly fitted with each other.

In the present invention, the quality of the motor module 10 can be tested before the motor module 10 is installed on other components of a water-cooling pump. If meeting the standards, the motor module 10 is allowed to be installed on other components of a water-cooling pump. Therefore, because the motor module 10 is ensured to meet the standards prior to installation, the water-cooling pump including the motor module 10 may not have the defect as the conventional pump may have defects found after assembling is completed. Moreover, in the conventional pump, after the defects are found or the pump cannot work, reassembling and changing the flawed parts consume cost and manpower. As a result, if any defect of the motor module is found, the first shell 11 and the second shell 12 can be separated at the first mounting portion 111 and the second mounting portion 121 easily for repairing, so the cost and consumption of time and manpower are lower.

Figure 3:
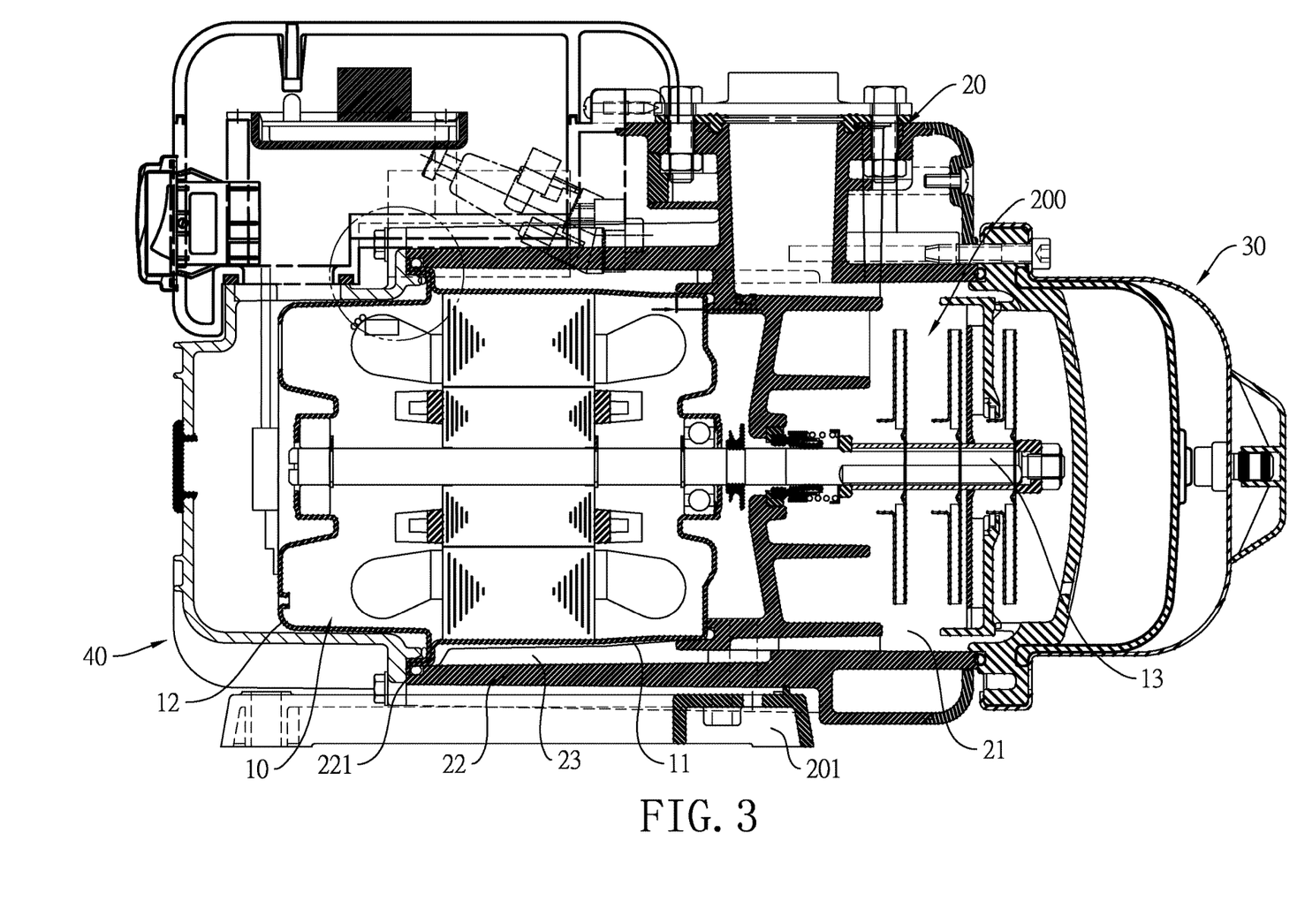
FIG. 3 is a sectional view of a part of the water-cooling pump in FIG. 2.

Please refer to FIG. 1, FIG. 2, and FIG. 3. A water-cooling pump is provided in accordance with the present invention. The water-cooling pump comprises the aforesaid motor module 10, a water machine 20, a pressured housing 30, and a motor cover 40. One end of the water machine 20 has an impeller chamber 21 and another end has a casing 22. The casing 22 is hollow and has an opening 221 away from the impeller chamber 21. The motor module 10 is mounted in the casing 22 via the opening 221. One end of the driving shaft 13 is mounted through the water machine 20 and located in the impeller chamber 21, and a drawing mechanism 200 is fixed on said end of the driving shaft 13. Two leak-proof rings are mounted on the casing 22 and correspond to the two ends of the first shell 11 in location. The first shell 11 is mounted on the casing 22 and thereby the two ends of the first shell 11 are sealed on the casing 22. The enclosing board 112 of the first shell 11 is capable of restricting the leak-proof ring. A flow passage 23 is formed between an inner surface of the casing 22 and an outer surface of the first shell 11. The flow passage 23 communicates with the impeller chamber 21 and thereby water can flow therein and cool the motor module 10. The means of flowing between the impeller chamber 21, the water machine 20, and the flow passage 23 are conventional, so there is no further description hereinafter.

The pressured housing 30 is mounted on the impeller chamber 21 of the water machine 20 and thereby the impeller chamber 21 is sealed. Thus, after the drawing mechanism 200 in the impeller chamber 21 is driven by the driving shaft 13, water may be drawn into the impeller chamber 21 and pressured and then discharged. The structure and function of the pressured housing 30 are conventional, so there is no further description hereinafter.

Figure 4:
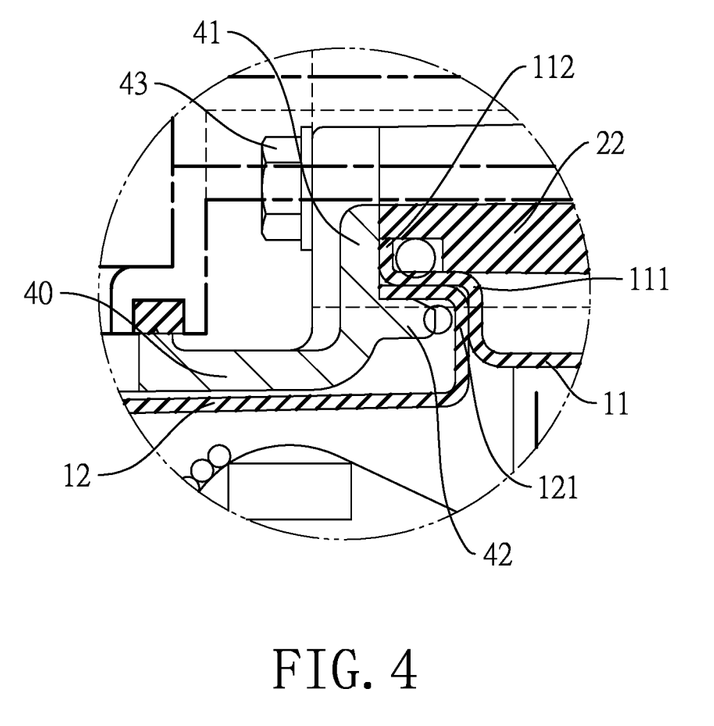
FIG. 4 is an enlarged sectional view of a part of the water-cooling pump in FIG. 2.

Then please refer to FIG. 3 and FIG. 4. The motor cover 40 is a hollow body and has an opening at an end. The motor cover 40 comprises a first enclosing portion 41 and a second enclosing portion 42. The first enclosing portion 41 protrudes outward in a radial direction and around the opening of the motor cover 40. The second enclosing portion 42 protrudes in an axial direction and around the opening of the motor cover 40. In a preferred embodiment as shown in the drawings, a cross section of the first enclosing portion 41 and the second enclosing portion 42 is L-shaped. The motor cover 40 is sleeved around the opening 221 of the casing 22. The casing 22 and the combined first mounting portion 111 and the second mounting portion 121 are located out of the second enclosing portion 42. The first enclosing portion 41 abuts an end of the casing 22, an end of the first mounting portion 111, and an end of the second mounting portion 121. Multiple fixing components 43 are mounted through the motor cover 40 and the water machine 20 such that the motor cover 40 and the water machine 20 are fixed on each other, and thereby the inner surface of the casing 22 is sealed on the outer surface of the first shell 11.

Figure 5:
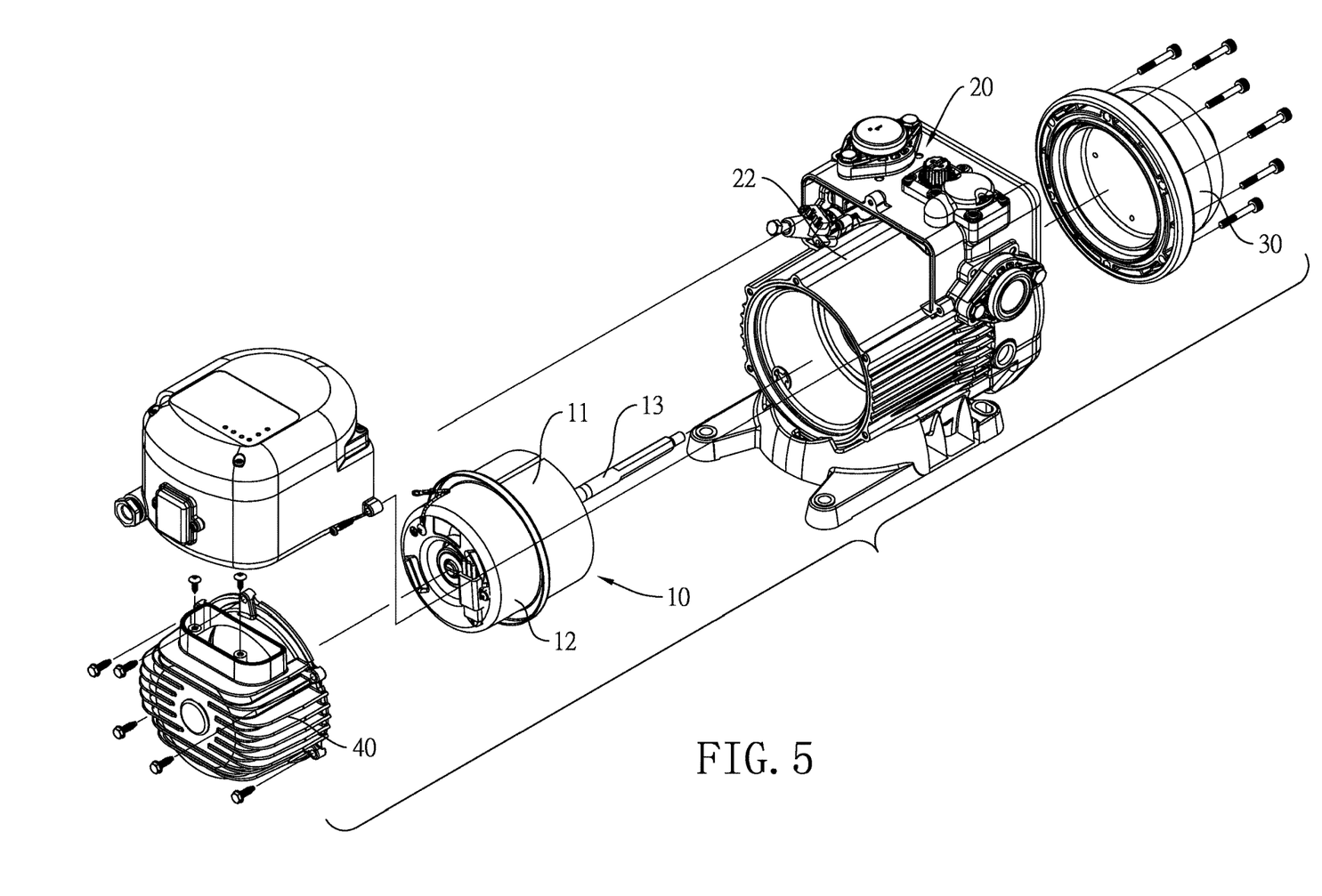
FIG. 5 is an exploded view of the water-cooling pump in FIG. 2.
Figure 6:
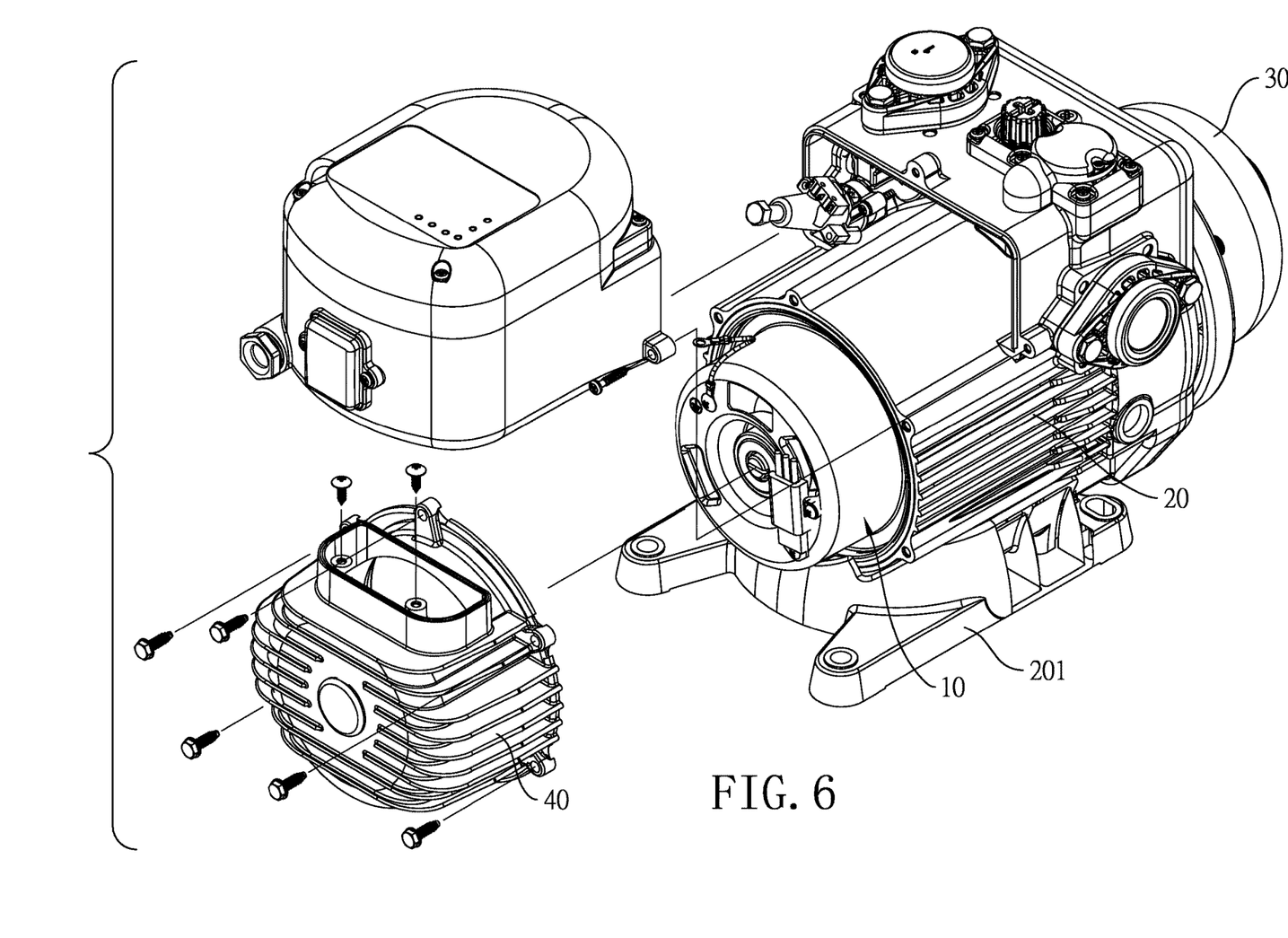
FIG. 6 is another exploded view of the water-cooling pump in FIG. 2.

Then please refer to FIG. 5 and FIG. 6. With the aforesaid structure, the motor module 10 of the present invention is modularized and has passed the examination and complied with the quality requirement, then the motor module 10 is installed on other components of a pump. The end of the motor module 10 on which the driving shaft 13 is mounted is inserted into the casing 22 of the water machine 20 until a predetermined position, a portion of the driving shaft 13 that is in the impeller chamber 21 is mounted on the drawing mechanism 200, the pressured housing 30 is mounted on the impeller chamber 21, and the motor cover 40 is mounted on the other end of the water machine 20. Thus, the consumption of time and manpower to install the motor module 10 on the water machine 20 and the motor cover 40 or detach the motor module 10 from the water machine 20 and the motor cover 40 is reduced.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A water-cooling pump comprising:
   a water machine comprising:
      an impeller chamber at an end of the water machine; and
      a casing at another end of the water machine, the casing being hollow and forming an opening; the opening of the casing located away from the impeller chamber;
   a drawing mechanism in the impeller chamber;
   a pressured housing mounted on the water machine and sealing the impeller chamber;
   a motor cover being hollow and forming an opening at an end thereof, the motor cover comprising:
      a first enclosing portion protruding outward in a radial direction and around the opening of the motor cover; and
      a second enclosing portion protruding in an axial direction and around the opening of the motor cover;
   a plurality of fixing components mounted through the motor cover and the water machine such that the motor cover and the water machine are fixed on each other; and
   a motor module mounted on the water machine and in the casing via the opening of the casing, the motor module comprising:
      a first shell being hollow and having a first end, the first end forming an opening, the first shell comprising a first mounting portion around the opening of the first shell and a cross section of the first mounting portion being L-shaped, the first mounting portion being disposed radially outside of the second enclosing portion;
      a second shell being hollow and having a second end, the second end forming an opening, the second end being detachably butted on the first end, the second shell comprising a second mounting portion around the opening of the second shell and a cross section of the second mounting portion being L-shaped, the second mounting portion being disposed radially outside of the second enclosing portion and mounted on the first mounting portion;
      a stator assembly mounted on an inner surface of the first shell;
      a driving shaft rotatably mounted in the first shell and the second shell; and
      a rotor assembly mounted on the driving shaft and corresponding to the stator assembly in location, wherein
   two ends of the first shell of the motor module are sealed on the casing, one end of the driving shaft is mounted through the impeller chamber and connected to the drawing mechanism;
   the casing is disposed radially outside of the second enclosing portion, the first enclosing portion abutting an edge of the casing, an edge of the first mounting portion, and an edge of the second mounting portion; and
   a flow passage is formed between an outer surface of the first shell and an inner surface of the casing.

2. The water-cooling pump as claimed in claim 1, wherein:
   the first shell comprises:
      an enclosing board extending from the first mounting portion in a direction different from an extending direction of the first mounting portion; and
      an annular groove adjacent to the opening of the first shell; and
   the second shell comprises:
      an annular protrusion adjacent to the opening of the second shell and engaging with the annular groove.

3. The water-cooling pump as claimed in claim 1, wherein:
   the first shell forms:
      a bearing seat located in the first shell and at a center of an end opposite the first end, the bearing seat of the first shell forming a through hole;

the second shell forms:
    a bearing seat located in the second shell and at a center of an end opposite the second end, the bearing seat of the second shell forming a through hole;
the motor module further comprises:
    two bearings respectively mounted on the bearing seat of the first shell and the bearing seat of the second shell; and
one end of the driving shaft is mounted through the through hole of the bearing seat of the first shell and the bearing on the bearing seat of the first shell; another end of the driving shaft is mounted through the through hole of the bearing seat of the second shell and the bearing on the bearing seat of the second shell.

4. The water-cooling pump as claimed in claim 2, wherein:

the first shell forms:
    a bearing seat located in the first shell and at a center of an end opposite the first end, the bearing seat of the first shell forming a through hole;
the second shell forms:
    a bearing seat located in the second shell and at a center of an end opposite the second end, the bearing seat of the second shell forming a through hole;
the motor module further comprises:
    two bearings respectively mounted on the bearing seat of the first shell and the bearing seat of the second shell; and
one end of the driving shaft is mounted through the through hole of the bearing seat of the first shell and the bearing on the bearing seat of the first shell; another end of the driving shaft is mounted through the through hole of the bearing seat of the second shell and the bearing on the bearing seat of the second shell.

\* \* \* \* \*